United States Patent
Risse et al.

(10) Patent No.: US 12,129,014 B2
(45) Date of Patent: Oct. 29, 2024

(54) CABIN LINING ELEMENT FOR AN AIRCRAFT CABIN AND RIB FOR AN AIRCRAFT FUSELAGE STRUCTURE

(71) Applicant: Airbus Operations GmbH, Hamburg (DE)

(72) Inventors: Stephan Risse, Hamburg (DE); Rainer Müller, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1430 days.

(21) Appl. No.: 16/498,774

(22) PCT Filed: Mar. 15, 2018

(86) PCT No.: PCT/DE2018/000065
§ 371 (c)(1),
(2) Date: Sep. 27, 2019

(87) PCT Pub. No.: WO2018/177449
PCT Pub. Date: Oct. 4, 2018

(65) Prior Publication Data
US 2021/0101668 A1   Apr. 8, 2021

(30) Foreign Application Priority Data
Mar. 31, 2017  (DE) ..................... 10 2017 106 998.4

(51) Int. Cl.
*B64C 1/40*  (2006.01)
*B64C 1/06*  (2006.01)
*H05B 3/14*  (2006.01)

(52) U.S. Cl.
CPC ................. *B64C 1/40* (2013.01); *B64C 1/06* (2013.01); *H05B 3/146* (2013.01); *H05B 2203/013* (2013.01); *H05B 2203/016* (2013.01)

(58) Field of Classification Search
None
See application file for complete search history.

(56) References Cited

U.S. PATENT DOCUMENTS

| | | | |
|---|---|---|---|
| 10,960,966 B2* | 3/2021 | Ischdonat | B64C 1/066 |
| 2002/0168184 A1* | 11/2002 | Meisiek | B64C 1/40 392/435 |

(Continued)

FOREIGN PATENT DOCUMENTS

| | | |
|---|---|---|
| CH | 705410 B1 | 2/2013 |
| DE | 102010052671 A1 | 5/2012 |

(Continued)

OTHER PUBLICATIONS

DE102014212623, Rekasch, Biblio data (Year: 2015).*

(Continued)

*Primary Examiner* — Elizabeth M Kerr
(74) *Attorney, Agent, or Firm* — Greer, Burns & Crain, Ltd.

(57) ABSTRACT

A cabin lining element for an aircraft cabin which is arranged in the interior of an aircraft fuselage structure, having a fuselage structure side and a cabin side. The cabin lining element comprises an electrically contactable heating lacquer layer at least in regions on its fuselage structure side. A rib is provided for an aircraft fuselage structure, having at least one foot portion on the outer skin facing side and a cabin facing side head portion. The rib comprises an electrically contactable heating lacquer layer at least in regions on a side of the head portion facing the cabin. As a result of the heating lacquer layer, it is possible to omit insulation which otherwise surrounds the rib heads and, as a consequence, to enlarge the width of the cabin.

19 Claims, 2 Drawing Sheets

(56) References Cited

U.S. PATENT DOCUMENTS

| | | | | |
|---|---|---|---|---|
| 2008/0302910 A1* | 12/2008 | Calamvokis | ........... | B64D 15/12 |
| | | | | 244/118.5 |
| 2013/0299630 A1 | 11/2013 | Redecker et al. | | |
| 2017/0238369 A1* | 8/2017 | Owens | ................... | H01C 17/06 |
| | | | | 428/116 |
| 2018/0118323 A1* | 5/2018 | Ischdonat | ............... | B32B 37/14 |
| 2018/0346133 A1* | 12/2018 | Paulson | ............... | H05B 3/0004 |
| 2019/0135442 A1 | 5/2019 | Seidler et al. | | |

FOREIGN PATENT DOCUMENTS

| | | | |
|---|---|---|---|
| DE | 102012207708 A1 | 11/2013 | |
| DE | 102014212623 A1 | 12/2015 | |
| DE | 102015005945 B3 | 8/2016 | |
| DE | 102016107908 A1 | 11/2017 | |

OTHER PUBLICATIONS

DE102014212623, Rekasch, Partial translation (Year: 2015).*
International Search Report; priority document.
German Search Report; priority document.

* cited by examiner

CABIN LINING ELEMENT FOR AN AIRCRAFT CABIN AND RIB FOR AN AIRCRAFT FUSELAGE STRUCTURE

CROSS-REFERENCES TO RELATED APPLICATIONS

This application claims the benefit of the International Application No. PCT/DE2018/000065, filed on Mar. 15, 2018, and of the German patent application No. 10 2017 106 998.4 filed on Mar. 31, 2017, the entire disclosures of which are incorporated herein by way of reference.

FIELD OF THE INVENTION

The invention relates to a cabin lining element for an aircraft cabin which is arranged in the interior of an aircraft fuselage structure and to a rib for an aircraft fuselage structure. The invention relates, in this connection, both to the thermal management of an aircraft fuselage and to aspects of the utilization of available space inside the aircraft fuselage.

BACKGROUND OF THE INVENTION

In order to prevent the condensing of moist air on structural cold bridges and, for reasons of thermal comfort, the interior of the aircraft cabin is insulated in relation to the aircraft fuselage structure located further on the outside. The thermal demands made on such insulation are high as, in particular, the temperature of the aircraft environment can be subject to fluctuations within the course of a normal flight between comparatively extreme temperatures, whereas in the interior of the aircraft cabin typically constant moderate temperatures are desired.

The design of such insulation is divided substantially into so-called primary insulation and secondary insulation. Primary insulation, as a rule, is arranged on and fastened to the aircraft fuselage structure, whereas secondary insulation is provided on the lateral cabin lining elements. Primary insulation typically covers the fuselage rib entirely, that is to say, also the rib heads which face the cabin. The outer delimitation of the aircraft cabin is formed, for example, in its longitudinal extent by a plurality of cabin lining elements which are strung together, each cabin lining element being fastened indirectly to the aircraft fuselage structure. Primary insulation and secondary insulation are typically formed from insulating mats which are filled with glass wool in their interiors.

In this case, in order to utilize the space available as efficiently as possible, the cabin lining elements are positioned as close as possible to the aircraft fuselage structure, almost no more space remaining in the region between the rib heads and the cabin lining elements. Only a small air gap exists there.

In order to increase the comfort of the aircraft passengers, it is desirable, on the one hand, to improve the thermal management of an aircraft fuselage and, on the other hand, to utilize the installation space available inside the aircraft fuselage in an even better manner.

It is an object of the invention to provide a system from, for example, a cabin lining element and/or a rib which makes this endeavor possible.

SUMMARY OF THE INVENTION

This object of the invention is achieved, on the one hand, by a cabin lining element for an aircraft cabin which is arranged in the interior of an aircraft fuselage structure, having a fuselage structure side and a cabin side, wherein the cabin lining element comprises an electrically contactable heating lacquer layer at least in regions on its fuselage structure side.

This object of the invention is also achieved by a rib for an aircraft fuselage structure, having at least one foot portion on the outer skin facing side and a cabin facing side head portion, wherein the rib comprises an electrically contactable heating lacquer layer at least in regions on a side of the head portion which faces the cabin.

The basic concept of the invention is the use of an electric heating lacquer in place of insulation which surrounds the rib head. The inventors have recognized the fact that as a result of utilizing electric energy in order to heat the heating lacquer layers, it is possible to compensate for the heat loss caused by the lack of insulation on the head portion of the rib. On account of the fact that with the rib according to the invention or with the cabin lining element according to the invention, it is no longer necessary to provide insulation on the rib heads (in particular, no insulating mats which are laid in the direction of the center of the cabin), it is possible to install cabin lining elements closer to the aircraft fuselage structure and, as a consequence, to enlarge the useful inside diameter of the cabin. This, in turn, can increase cabin comfort for passengers. It is obvious that the space gain accompanying the invention comes on both sides of the cabin.

With the cabin lining element according to the invention in the installed state, the heating lacquer layer comes to rest on a head portion of a conventional rib or of a rib according to the invention of the aircraft fuselage structure, without any insulation being provided on this rib. As a result of the cabin lining element according to the invention or of the rib according to the invention it is possible to dispense with rib head insulation. In other words: the cabin lining element according to the invention or the rib according to the invention compensate for the lack of rib head insulation as a result of the electrically heatable heating lacquer layer which is provided on the cabin lining element and/or on the rib.

On account of the fact that the heating lacquer layer is arranged on the head portion of the rib and no insulation is provided in the region of the rib head, both the thermal insulation in the region of the rib head is able to be maintained and the cabin lining element is able to be positioned closer to the rib in the installed state.

The fuselage structure side of the cabin lining element is to be understood as the side of the cabin lining element which faces the nearest aircraft fuselage structure with the cabin lining element in the normal installation position. The cabin side of the cabin lining element is to be understood as the side of the cabin lining element which faces the interior of the cabin with the cabin lining element in the normal installation position. The aircraft fuselage structure typically includes ribs (or frames) with a foot portion on the outer skin facing side and a cabin facing side head portion as well as longitudinal reinforcing elements (stringers).

A heating lacquer is to be understood as an electrically conductive paint which generates heat and consequently, among other things, thermal radiation when current and/or voltage is applied to the paint. The heating lacquer can include electrically conductive polymers, in particular, carbon-based polymers. The electrical conductivity is improved, as a rule, as a result of the addition of carbon particles. In a preferred manner, the specific weight of the heating lacquer that forms the heating lacquer layer is less than 200 g/m2. Heating lacquer layers with such specific weights have proved to be particularly suitable in practice.

Preferred is a system, including a cabin lining element according to the invention and/or a rib according to the invention. In principle, it is possible to provide a system which comprises both cabin lining elements according to the invention and ribs according to the invention. The operating principle of the heating lacquer layers provided then per rib can consequently be boosted.

An embodiment of the system is additionally preferred where no cabin-lining-element-side or rib-head-side insulation is arranged in the region of the heating lacquer layer. In particular, no insulating mats are provided in this region according to this embodiment. As a result of the lack of cabin-lining-element-side or rib-head-side insulation, it is possible to move the installation position of the cabin lining element closer to the aircraft fuselage structure located on the outside. As a result, the useful cabin space, in particular the useful diameter of the cabin, and, as a consequence, passenger comfort, is increased.

A further embodiment of the system is also preferred where the heating lacquer layer comprises a strip-shaped extent, the strip width of which corresponds substantially to a rib head width. As a result of the strip-shaped extent of the heating lacquer layer, it is adapted to the usual geometric form of the rib head (or of the cabin facing side surface form of the rib head) and can consequently develop its effect compensating for the lack of insulation.

In the case of an equally preferred embodiment of the system, the thickness of the heating lacquer layer is between 0.1 mm and 0.5 mm, in particular, the thickness of the heating lacquer layer is 0.3 mm. In the case of corresponding thicknesses of the heating lacquer layer, it is possible to ensure, on the one hand, the compensation effect for the lack of insulation, on the other hand, a significant space gain is achieved in the interior of the cabin. Large improvements can be obtained with reference to achievable passenger comfort compared to previously known solutions with pure glass wool insulation.

An embodiment of the system is preferred additionally where an electrically insulating protective layer is provided between the heating lacquer layer and the cabin lining element and/or between the heating lacquer layer and the rib. The electrically insulating protective layer uncouples the heating lacquer layer and the electrical control or power supply thereof in an electrical regard from the fuselage structure.

An embodiment of the system is also preferred which additionally includes: two conductors to which the respective electrical poles of the heating lacquer layers are electrically connectable, and a power source, to which the conductors are electrically connectable. The power source can be, for example, a direct current source on-board the aircraft. In order to meet the safety requirements in the cabin area, voltage levels of approximately 28 volts are preferred for the power source. In order to switch the system according to the invention on and off where necessary, a corresponding switching device can be provided. When a plurality of cabin lining elements are provided arranged one behind another in the longitudinal direction of the aircraft cabin, the power source is typically arranged in the region of the first or last cabin lining element (that is to say, in the front or rear area of the aircraft fuselage). It is obvious that the power source can also be arranged as an alternative to this at other locations of the aircraft or of the aircraft fuselage. A power density of approximately 200 W/m2 is desired in order to ensure the heating lacquer layers are sufficiently electrically heated. The conductors can extend, for example, as electric cabling individually or together in the longitudinal direction of the aircraft either in or on the cabin lining elements or in the region of the aircraft fuselage structure. As an alternative to electric cabling, conductors can be also be realized as busbars.

In the case of a preferred further development of the preceding embodiment of the system, the system includes a plurality of cabin lining elements, wherein at least one of the two conductors is formed by busbars which are integrated in portions into adjacent cabin lining elements. In this way, the installation expenditure can be advantageously reduced. By inserting the cabin lining elements into their installation position on the fuselage structure, the conductors are consequently gradually assembled fully as a sequence of multiple busbars. To integrate individual busbars into the respective cabin lining elements, the busbars can be laminated, for example, into the cabin lining elements. As an alternative to this or in addition to it, receiving means or grooves can also be provided in each cabin lining element, in a preferred manner in a region close to the bottom of the cabin lining element, to integrate the busbars into the respective cabin lining elements. It is obvious that not just one of the two conductors has to be integrated as busbars in the cabin lining elements but that it is equally possible and advantageous to form both or further conductors by busbars integrated in portions in adjacent cabin lining elements. The same applies naturally with regard to the possible integration of receiving means or grooves in the cabin lining elements. The busbars can be formed, for example, from copper and comprise a rectangular or square cross section.

In the case of a preferred further development, the cabin lining elements comprise electrical connecting means for the electrical contacting of adjacent busbars. The electrical connecting means can be realized, for example, as a quick-closing electrical plug/socket connection (sliding quick connector or click-and-fit). In this way, the production of the electrical connection between the adjacent cabin lining elements can be effected in a particularly fast and simple as well as secure manner.

Finally, an aircraft is preferred, having a cabin lining element according to the invention, and/or a rib according to the invention, and/or a system according to the invention. Such an aircraft according to the invention makes use of the advantages of the cabin lining elements or ribs by a passenger cabin being provided that is larger in its cross section and as a consequence, more comfortable. Structural modifications to the existing aircraft fuselage structure, in this case, are advantageously not necessary.

The above-described aspects and further aspects, features and advantages of the invention can also be found in the examples of the embodiments which are described below with reference to the accompanying drawings.

BRIEF DESCRIPTION OF THE DRAWINGS

Identical reference symbols are used for identical or at least similar elements, components or aspects in the figures. It is noted that an embodiment is described in detail below which is simply illustrative and not limiting. In the claims, the word "comprising" does not exclude other elements and the indefinite article "a" does not exclude a plurality. Solely the circumstance of certain features being named in different dependent claims does not limit the object of the invention. Combinations of said features are able to be used in an advantageous manner. The reference symbols in the claims are not to limit the extent of the claims. The figures are not be understood to scale but are only schematic and illustrative in character, in which:

DETAILED DESCRIPTION OF THE PREFERRED EMBODIMENTS

Figure 1:
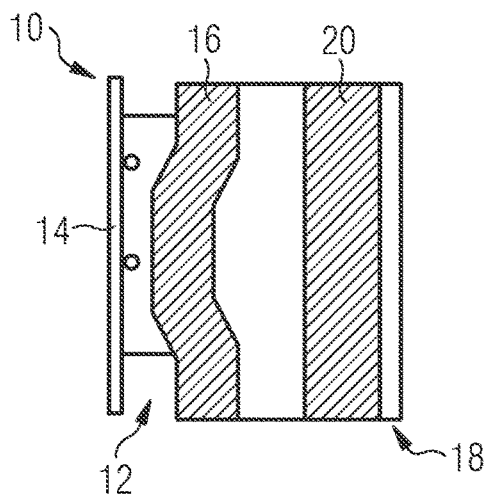
FIG. 1 shows a cross section through an aircraft fuselage external wall according to the prior art, including an aircraft fuselage structure and a cabin lining element.

FIG. 1 shows a conventional aircraft fuselage wall 10 in cross section. The aircraft fuselage wall 10 includes, on the one hand, an aircraft fuselage structure 12 with an outer skin 14 and a primary insulation 16 which is fastened to the aircraft fuselage structure 12. On the other hand, the aircraft fuselage wall 10 includes a cabin lining element 18 which is arranged on the cabin side and has secondary insulation 20. The primary insulation 16 typically covers the aircraft fuselage structure 12 on the side of the outer skin. The primary insulation 16 and the secondary insulation 20 are typically formed from insulating mats which are filled in their interior with glass wool. The thermal management and the temperature setting in the aircraft cabin is influenced as a result of arranging the primary and secondary insulation 16, 20 in the aircraft fuselage wall 10. The aircraft cabin is limited, among other things, by a plurality of cabin lining elements 18 which are adjacent and are arranged side by side in the longitudinal direction of the aircraft, each cabin lining element 18 being fastened indirectly to the aircraft fuselage structure 12.

Figure 2:
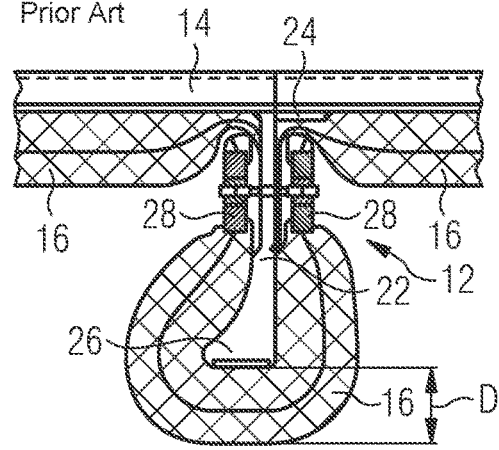
FIG. 2 shows a longitudinal section through an aircraft fuselage external wall according to the prior art, including a fully insulated rib for an aircraft fuselage structure.

FIG. 2 shows a longitudinal section through a conventional aircraft fuselage structure 12. The outer skin 14 is fastened to a rib 22 which comprises a foot portion 24 on the outer skin facing side and a cabin facing side head portion 26. The aircraft fuselage structure 12, that is to say, the outer skin 14 and the rib 22, are covered entirely by the insulation 16. In the region of the foot portion 26 of the rib 22, the insulation 16, which includes insulating mats of glass wool, is fastened to the rib 22 by clips 28 on both sides. In the case of the known aircraft fuselage structure 12, the insulation 16 is also arranged in the region of the head portion 26, in particular around the same, such that it is laid on, for instance, by the insulation thickness D in the direction toward the cabin.

Figure 3:
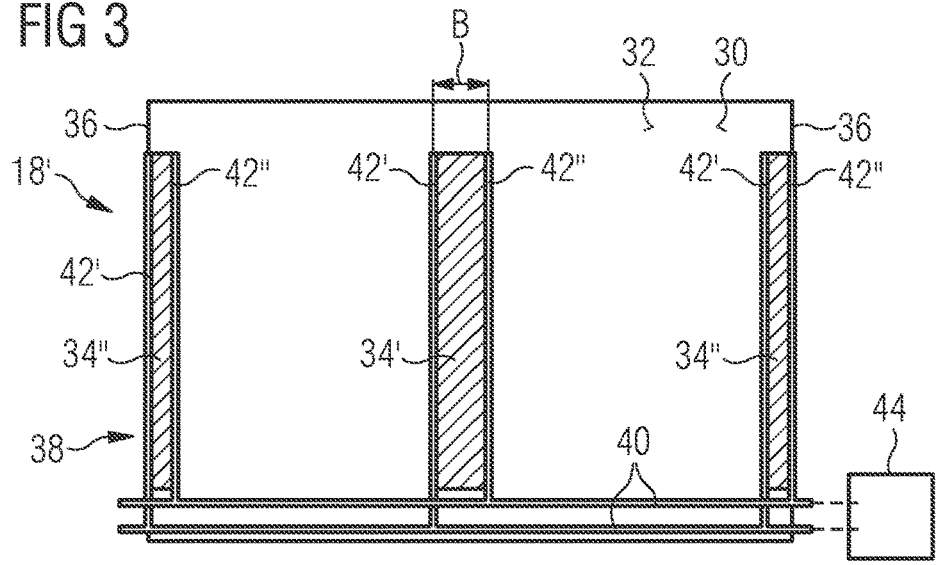
FIG. 3 shows a side view of a cabin lining element according to the invention.

FIG. 3 shows a cabin lining element 18' according to the invention. The cabin lining element 18' is suitable to be mounted on an aircraft fuselage structure (for example, the aircraft fuselage structure 12 described in FIG. 1) on the cabin side. It comprises a fuselage structure side 30 and a cabin side 32, an electrically contactable heating lacquer layer 34 being provided at least in regions on its fuselage structure side 30. The heating lacquer layer 34 is a thin coating of a heating lacquer which generates heat when current and/or voltage is applied. Electrically conductive carbon-based polymers are preferred, in particular, as heating lacquer.

According to the invention, the heating lacquer layer 34 is arranged on the cabin lining element 18' in the regions of the fuselage structure side 32 which, with the cabin lining element 18' in the installed state, are located directly opposite the respective ribs 22, in particular, the respective head portions 26. In FIG. 3, this is one heating lacquer layer 34' which is arranged in a central region on the cabin lining element 18' and two heating lacquer layers 34" which are arranged in the regions of the front and rear edges 36 of the cabin lining element 18'. The heating lacquer layers 34', 34" comprise a strip-shaped extent, the strip width B of which corresponds substantially to a rib head width S (cf. FIG. 4). In FIG. 3, the strip width of the heating lacquer layer applied to the front and rear edges 36 amounts to approximately half the rib head width S/2 so that together with the respective adjacent cabin lining element 18' approximately the full rib head width S is reached again.

Figure 4:
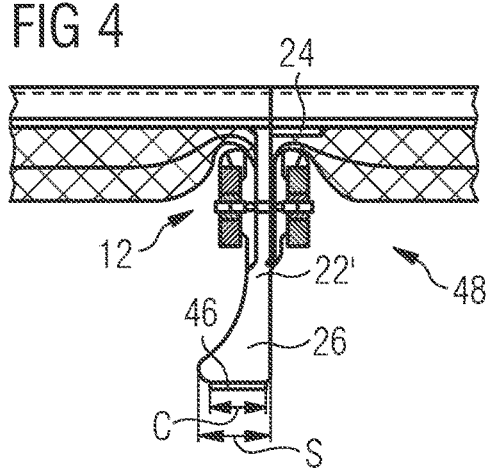
FIG. 4 shows a longitudinal section through an aircraft fuselage external wall with a rib according to the invention.

Consequently, with the cabin lining element 18' according to the invention in the installed state, the heating lacquer layers 34', 34" come to rest against the respectively corresponding head portions 26 of the oppositely situated rib 22 of the aircraft fuselage structure 12, without any insulation 16 being provided on the head portion 26 of the oppositely situated rib 22 (cf. FIG. 4). In other words: There is no rib-head-side or cabin-lining-element-side insulation 16 arranged in the region of the heating lacquer layer 34. It is consequently possible, as a result of the cabin lining element 18' according to the invention, to dispense in an advantageous manner with any rib head insulation because by utilizing electric energy in order to heat the heating lacquer layers 34', 34", it is possible to compensate for the thermal loss due to the lack of insulation on the head portion 26.

Using the cabin lining element 18', a system 38 is provided as a result of which it is no longer necessary to provide insulation on the ribs 22, which is typically laid on by the insulation thickness D (cf. FIG. 2) in the direction of the center of the cabin. The thickness of the heating lacquer layers 34', 34" can be between 0.1 mm and 0.5 mm in a preferred manner Consequently, it is possible to install the cabin lining elements 18' closer to the aircraft fuselage structure 12 and, as a consequence, to enlarge the useful internal diameter of the cabin. In other words: As a result of the cabin lining element 18', it is possible to reduce the distance between the fuselage structure 12 and the cabin lining element 18'.

The system 38, irrespective of whether it includes the cabin lining element 18' and/or the rib 22 according to FIG. 4, can additionally comprise two conductors 40 by way of which the respective electrical poles 42', 42" of the heating lacquer layer 34', 34" can be electrically connected together. In addition, the system 38 also includes a power source 44 by way of which the conductors 40 are electrically connectable. The system 38 typically comprises a plurality of cabin lining elements 18'. These are then arranged on the aircraft fuselage structure 12 along the longitudinal direction of the cabin. The two conductors 40 are formed by busbars which are integrated in portions into adjacent cabin lining elements 18'.

FIG. 4 shows an alternative embodiment of the invention in the form a rib 22'. The rib 22' comprises at least one foot portion 24 on the side of the outer skin and one cabin facing side head portion 26, the rib 22' comprising an electrically contactable heating lacquer layer 46 at least in regions on a side of the head portion 26 facing the cabin. The heating lacquer layer 46 is, as in the case of the alternative cabin lining element 18', a coating of a heating lacquer which generates heat when electrical current and/or voltage is applied. The thickness of the heating lacquer layer 46 is also, in a preferred manner, between 0.1 mm and 0.5 mm. The heating lacquer layer 46 is arranged on the side of the rib 22' which faces the cabin, as a result of which the heating lacquer layer 46, with the cabin lining element 16 in the mounted state, comes to rest close to the fuselage structure side 30 thereof. The heating lacquer layer 46 comprises a strip-shaped extent, the strip width C thereof corresponding substantially to the rib head width S (cf. FIG. 4). In order to uncouple the heating lacquer layer 46 electrically from the fuselage structure 12, it is possible to provide an electrically insulating protective layer between the heating lacquer layer 46 and the rib 22' (not shown).

In this way, with the cabin lining element 18, 18' in the mounted state, the heating lacquer layer 46 of the rib 22' comes to abut against the fuselage structure side 30 of the cabin lining element 18, 18' without any insulation being arranged on the head portions 26. (The cabin lining element 18 can then also be realized in a conventional manner, i.e., without the heating lacquer layer 34 according to the invention). Accordingly, no rib-head-side or cabin-lining-element-side insulation 16 is provided in the region of the heating lacquer layer 46. Using the rib 22' according to the invention, a system 48 is provided by means of which insulation, which would typically be laid by the insulation thickness D (cf. FIG. 2) in the direction of the center of the cabin, is no longer necessary on the head portions 26. Consequently, it is possible to install the cabin lining elements 18, 18' closer to the aircraft fuselage structure 12 and, as a consequence, to enlarge the useful inside diameter of the cabin.

Figure 5:
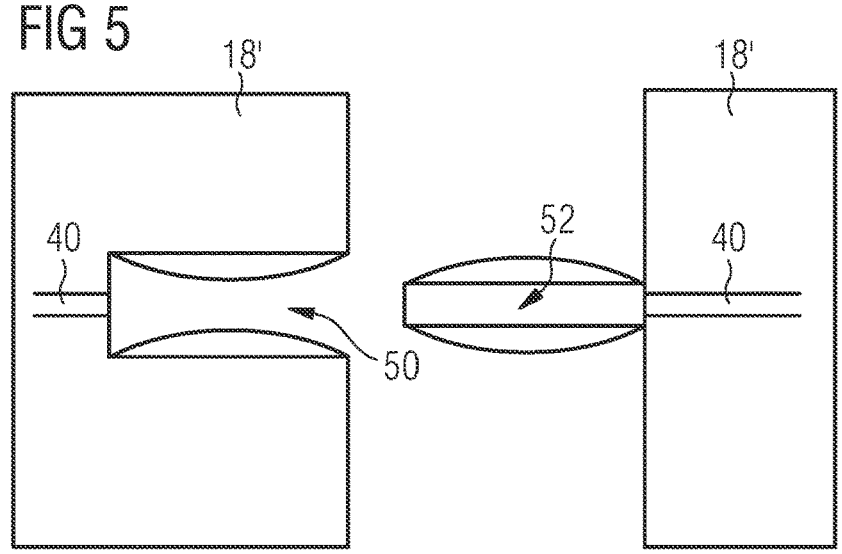
FIG. 5 shows a side view of connecting means according to the invention for adjacent cabin lining elements.
Figure 6:
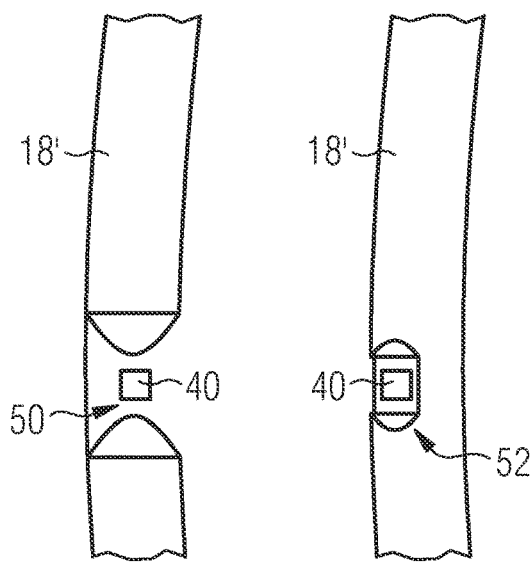
FIG. 6 shows views, in the longitudinal direction of the aircraft, of the connecting means of the cabin lining elements from FIG. 5.

FIG. 5 and FIG. 6 show details of a side view and of a view directed in the longitudinal direction of the aircraft of two adjacent cabin lining elements 18' according to FIG. 3 in the region of the conductors 40, which are realized by busbars. The cabin lining elements 18' comprise electrical connecting means 50, 52 for the electrical contacting of the respectively adjacent busbars. The corresponding male and female connecting means 50, 52 can be realized, for example, as quick-closing electric plug-socket elements. Spring elements, which ensure secure and permanent contacting, can be provided for this purpose in each case on the male and female connecting means 50, 52.

Figure 7:
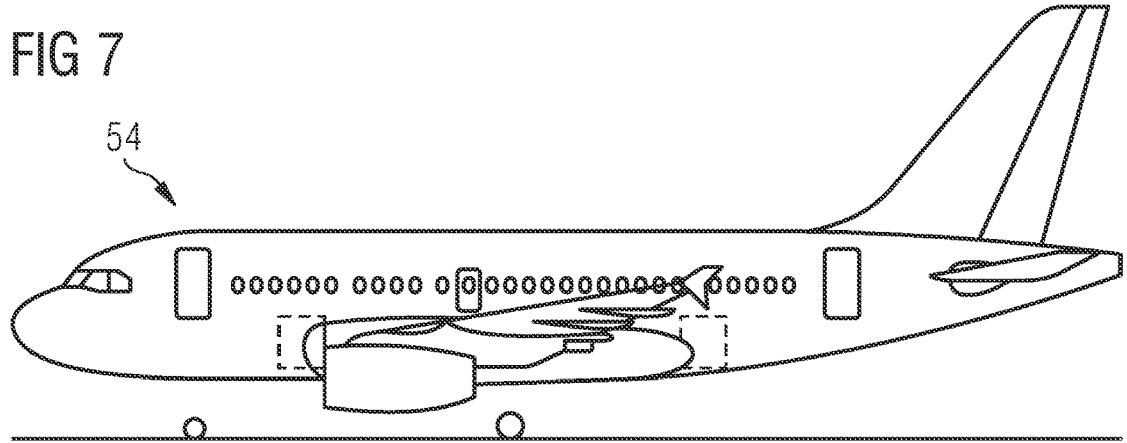
FIG. 7 shows a side view of an aircraft according to the invention.

Finally, FIG. 7 shows an aircraft 54, in the interior of which cabin lining elements 18' and/or ribs 22' and/or a corresponding system 38, 48 are provided.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCES

10 Aircraft fuselage wall
12 Aircraft fuselage structure
14 Outer skin
16 Primary insulation
18 Cabin lining element (prior art)
18' Cabin lining element (according to the invention)
20 Secondary insulation
22 Rib (prior art)
22' Rib (according to the invention)
24 Foot portion
26 Head portion
28 Clips
30 Fuselage structure side
32 Cabin side
34 Heating lacquer layer for cabin lining element (according to the invention)
34' Heating lacquer layer for cabin lining element (according to the invention)
34" Heating lacquer layer for cabin lining element (according to the invention)
36 Edges of the cabin lining element
38 System
40 Conductor
42' Electrical pole
42" Electrical pole
44 Power source
46 Heating lacquer layer for rib (according to the invention)
48 System
50 Electrical connecting means, female
52 Electrical connecting means, male
54 Aircraft (according to the invention)
B Strip width
C Strip width
S Rib head width

The invention claimed is:

1. A cabin lining element for an aircraft cabin which is arranged in the interior of an aircraft fuselage structure, having
    a fuselage structure side, and
    a cabin side,
    wherein the cabin lining element comprises an electric heating lacquer layer at least in regions on its fuselage structure side, and
    wherein the heating lacquer layer comprises a strip-shaped extent, a strip width of which corresponds substantially to a rib head width.

2. A system including a cabin lining element as claimed in claim 1.

3. The system as claimed in claim 2, wherein no cabin-lining-element-side or rib-head-side insulation is arranged in the regions of the heating lacquer layer.

4. The system as claimed in claim 2, wherein a thickness of the heating lacquer layer is between 0.1 mm and 0.5 mm.

5. The system as claimed in claim 2, wherein an electrically insulating protective layer is provided between the heating lacquer layer and the cabin lining element.

6. The system as claimed in claim 2, additionally including two conductors to which the respective electrical poles of the heating lacquer layers are electrically connectable, and a power source, to which the conductors are electrically connectable.

7. The system as claimed in claim 6, wherein the system includes a plurality of cabin lining elements, wherein at least one of the two conductors is formed by busbars which are integrated in portions into adjacent cabin lining elements.

8. The system as claimed in claim 7, wherein the cabin lining elements comprise electrical connecting means for electrical contacting of adjacent busbars.

9. An aircraft including a cabin lining element as claimed in claim 1.

10. An aircraft including a system as claimed in claim 2.

11. A cabin lining element for an aircraft cabin which is arranged in the interior of an aircraft fuselage structure, having
a fuselage structure side, and
a cabin side,
wherein the cabin lining element comprises an electric heating lacquer layer at least in regions on its fuselage structure side, and
wherein no cabin-lining-element-side or rib-head-side insulation is arranged in the regions of the heating lacquer layer.

12. A system including a cabin lining element as claimed in claim 11.

13. The system as claimed in claim 12, wherein a thickness of the heating lacquer layer is between 0.1 mm and 0.5 mm.

14. The system as claimed in claim 12, wherein an electrically insulating protective layer is provided between the heating lacquer layer and the cabin lining element.

15. The system as claimed in claim 12, additionally including two conductors to which the respective electrical poles of the heating lacquer layers are electrically connectable, and a power source, to which the conductors are electrically connectable.

16. The system as claimed in claim 15, wherein the system includes a plurality of cabin lining elements, wherein at least one of the two conductors is formed by busbars which are integrated in portions into adjacent cabin lining elements.

17. The system as claimed in claim 16, wherein the cabin lining elements comprise electrical connecting means for electrical contacting of adjacent busbars.

18. An aircraft including a cabin lining element as claimed in claim 11.

19. An aircraft including a system as claimed in claim 12.

* * * * *